T. A. WILLARD.
CONNECTOR FOR STORAGE BATTERIES.
APPLICATION FILED APR. 29, 1915.

1,150,918.

Patented Aug. 24, 1915.

Witnesses
E. B. Gilchrist
L. I. Porter

Inventor
Theodore A. Willard
by Thurston & Kwis
Attys.

UNITED STATES PATENT OFFICE.

THEODORE A. WILLARD, OF CLEVELAND, OHIO, ASSIGNOR TO THE WILLARD STORAGE BATTERY COMPANY, OF CLEVELAND, OHIO, A CORPORATION OF OHIO.

CONNECTOR FOR STORAGE BATTERIES.

1,150,918.  Specification of Letters Patent.  Patented Aug. 24, 1915.

Application filed April 29, 1915. Serial No. 24,635.

*To all whom it may concern:*

Be it known that I, THEODORE A. WILLARD, a citizen of the United States, residing at Cleveland, in the county of Cuyahoga and State of Ohio, have invented a certain new and useful Improvement in Connectors for Storage Batteries, of which the following is a full, clear, and exact description.

This invention relates to connectors for storage batteries and has for its object to provide a construction such that when the connector is applied to a terminal post the latter will be automatically sealed against creepage of battery solution.

The invention may be briefly summarized as consisting in certain novel details of construction and combinations of features which will be described in the specification and set forth in the appended claims.

Figure 1:
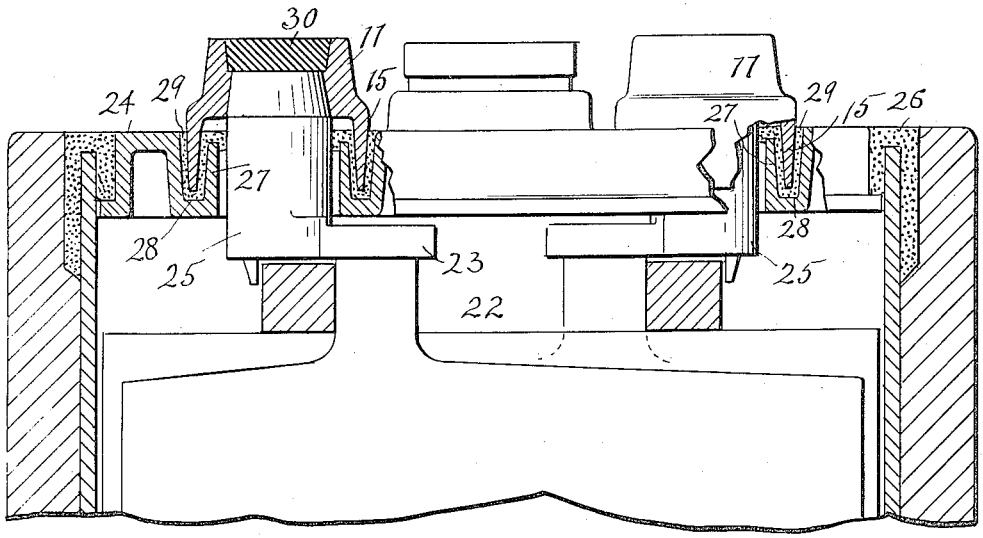
Figure 2:
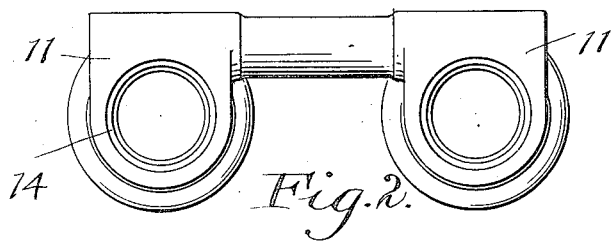
Figure 3:
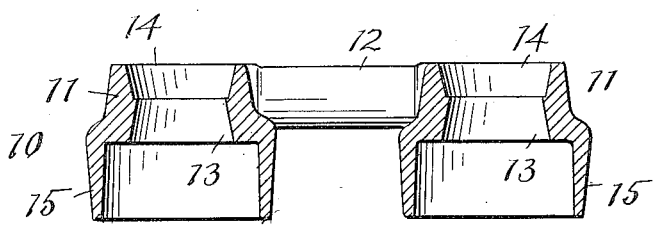
Figure 4:
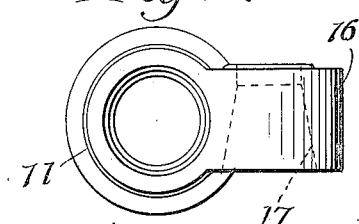

In the drawings, Figure 1 is a sectional view through the upper portion of a storage battery equipped with my invention; Fig. 2 is a plan view of a cell connector embodying the invention; Fig. 3 is a sectional view of the same; Fig. 4 is a plan view of a terminal connector embodying my invention; and Fig. 5 is a sectional view of the same.

In Figs. 2 and 3 I have shown a connector which embodies my invention and which is adapted to connect the positive or negative plates of one cell to the plates of opposite polarity of the adjoining cell. This connector which is preferably formed of lead is provided with two socketed body portions 11 connected together by an integral cross member 12. The socket in each member or portion 11 is composed of two oppositely beveled parts 13 and 14, the former of which is adapted to receive the upper beveled end of the terminal post and the latter of which is adapted to receive the melted lead formed when the connector is lead burned to the post, as will be subsequently described. Additionally, each body portion 11 of the connector is provided with a downwardly extending annular flange or so-called petticoat 15 which is preferably tapered on the outer surface and the internal diameter of which is greater than the greatest diameter of the socket portions 13 and 14. The purpose of this flange or petticoat will be subsequently explained.

Figure 5:
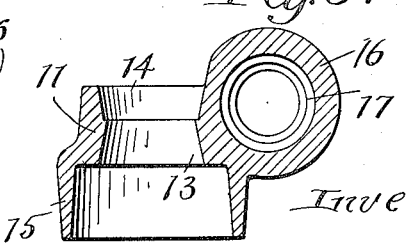

In Figs. 4 and 5 I have shown my invention embodied in a terminal connector for a storage battery. This terminal connector, which also is formed of lead, is provided with the body portion 11, provided with a socket having two oppositely beveled portions 13 and 14 and with a downwardly extending annular petticoat or flange 15 similar to the corresponding parts of the connector shown in Figs. 2 and 3. Additionally, the terminal connector of Figs. 4 and 5 is provided with an integral lug or boss 16 having a socket 17, which is preferably tapered and is adapted to receive the end of a positive or negative lead or conductor.

For an understanding of the function of the flange or petticoat 15 of either form of the connector, reference is had to Fig. 1, showing the upper part of a battery having a jar or receptacle 20 containing the usual alternately arranged positive and negative battery plates 22, the two groups of plates being connected to straps 23 from which extend upwardly through a cover 24 terminal posts 25. The cover 24 which is sealed around its perimeter to the container, as shown at 26, is of irregular shape and is provided with downwardly and upwardly extending flanges, including two annular upwardly extending flanges 27 through which the terminal posts 25 extend. Additionally, the cover is provided with a rather deep annular recess or depression 28 surrounding each of the flanges 27, this recess extending from the top plane of the cover nearly to the bottom plane thereof, and having a depth equal substantially to the height of the petticoat or flange 15 on each of the connectors.

The connector, whether of the form shown in Figs. 2 and 3, or of the form shown in Figs. 4 and 5, is fitted onto and secured to one of the terminal posts 25 with the lower beveled part 13 of the socket in the body portion 11 fitting closely, the upper end of the terminal post and with the flange or petticoat 15 extending well down into the annular recess or depression 28 nearly to the bottom thereof this flange or recess being spaced from the flanges forming the two side walls of the recess. Before the connector is placed onto the terminal post, this recess is filled or substantially filled with a cement or sealing compound 29, and prior to being placed in position on the terminal post the terminal is slightly heated so that the flange or petticoat 15 may be forced down into the cement or sealing compound.

Then the connector and terminal post are lead burned so as to form a sealed joint and a substantially integral construction between the post and connector, the upper beveled part 14 of the socket being filled with melted lead which is shown at 30. The heat which is imparted to the body portion 11 and flange or petticoat 15 of the connector during the lead burning operation just referred to melts the cement or sealing compound and thus there is caused an automatic sealing of the post, this seal effectively preventing the creepage of acid or battery solution out along the post to the outside of the cover. By sealing the battery around the post in this manner, it is unnecessary that the parts be accurately formed, and inasmuch as the sealing is accomplished principally by the lead burning operation, due, of course, to the presence of the petticoat or flange and the recess into which it projects, the sealing is accomplished easily and inexpensively.

Connectors of the form shown in Figs. 2 and 3 will be employed and secured to the terminal posts in the manner above stated to connect together the battery plates of opposite polarity of adjoining cells, and the connectors of the form shown in Figs. 4 and 5 will be placed on two of the terminal posts of the two end cells so that the two positive and negative leads may be connected to the battery. In this application the improvement claimed is the connector either in the form shown in Figs. 2 and 3 or the form shown in Figs. 4 and 5. The improvements in the battery cover and the combination of the features of the cover, terminal post and connector are made the subject matter of another application filed of even date herewith.

Having thus described my invention, what I claim is:—

1. A connector for a storage battery having a body portion adapted to be connected to a terminal post and having a downwardly extending flange or petticoat extending substantially parallel with the axis of the connector so as to form a recess in the bottom of the connector.

2. A connector for a storage battery composed of a body portion having a socket and a downwardly extending flange or petticoat of greater internal diameter than the internal diameter of the socket.

3. A connector for a storage battery composed of a body portion having a socket composed of upper and lower portions beveled in opposite directions and a downwardly extending annular flange or petticoat.

4. A connector for a storage battery having a body portion provided with a socket adapted to receive a terminal post, and provided with an annular tapered flange or petticoat which projects beneath the body portion and is of greater internal diameter than the internal diameter of the socket.

In testimony whereof, I hereunto affix my signature in the presence of two witnesses.

THEODORE A. WILLARD.

Witnesses:
L. I. PORTER,
A. J. HUDSON.